(12) United States Patent
Kunimoto et al.

(10) Patent No.: US 11,272,586 B2
(45) Date of Patent: Mar. 8, 2022

(54) HEATING COOKER

(71) Applicant: Panasonic Intellectual Property Management Co., Ltd., Osaka (JP)

(72) Inventors: Keijirou Kunimoto, Shiga (JP); Daisuke Hosokawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 16/074,700

(22) PCT Filed: Dec. 21, 2016

(86) PCT No.: PCT/JP2016/005201
§ 371 (c)(1),
(2) Date: Aug. 1, 2018

(87) PCT Pub. No.: WO2017/141298
PCT Pub. Date: Aug. 24, 2017

(65) Prior Publication Data
US 2019/0045590 A1 Feb. 7, 2019

(30) Foreign Application Priority Data

Feb. 19, 2016 (JP) .................................. 2016-029406

(51) Int. Cl.
*H05B 6/68* (2006.01)
*F24C 7/06* (2006.01)
(Continued)

(52) U.S. Cl.
CPC .......... *H05B 6/687* (2013.01); *A47J 37/0629* (2013.01); *F24C 1/04* (2013.01);
(Continued)

(58) Field of Classification Search
CPC ................ A47J 37/0629; A47J 37/0641; A47J 37/0623; A47J 39/006; A47J 47/145;
(Continued)

(56) References Cited

U.S. PATENT DOCUMENTS 2,798,930 A * 7/1957 Frost .......................... F24C 7/06
219/392
4,675,507 A * 6/1987 Akiyoshi .................. F24C 7/06
126/275 E
(Continued)

FOREIGN PATENT DOCUMENTS

CN 102777945 11/2012
JP 03-50421 3/1991
(Continued)

OTHER PUBLICATIONS

International Search Report of PCT application No. PCT/JP2016/005201 dated Mar. 7, 2017.
(Continued)

*Primary Examiner* — Tu B Hoang
*Assistant Examiner* — Diallo I Duniver
(74) *Attorney, Agent, or Firm* — Wenderoth, Lind & Ponack, L.L.P.

(57) ABSTRACT

The heating cooker includes a first heater disposed below a tray to heat the tray, and second heater disposed over the tray to heat the tray. In addition, the heating cooker includes a controller that controls output of the first heater and switches energization of second heater in accordance with a kind of object to be heated and a quantity of object to be heated. Furthermore, second heater includes two plane-shaped insulators and a plurality of planar heat generators that are sandwiched between insulators, and the controller heats regions that are disposed over and below the tray to be opposed to each other by controlling energization of the first
(Continued)

heater and second heater. Furthermore, second heater has a distortion suppressor between the plurality of planar heat generators, and the distortion suppressor suppresses internal distortion of insulators caused by heating of the plurality of planar heat generators of second heater.

8 Claims, 11 Drawing Sheets

(51) Int. Cl.
    *H05B 6/64*     (2006.01)
    *F24C 7/04*     (2021.01)
    *H05B 6/72*     (2006.01)
    *H05B 3/28*     (2006.01)
    *F24C 1/04*     (2021.01)
    *A47J 37/06*     (2006.01)
    *F24C 7/08*     (2006.01)

(52) U.S. Cl.
    CPC .............. *F24C 7/046* (2013.01); *F24C 7/067* (2013.01); *H05B 3/286* (2013.01); *H05B 6/6402* (2013.01); *H05B 6/6408* (2013.01); *H05B 6/6435* (2013.01); *H05B 6/6482* (2013.01); *H05B 6/6491* (2013.01); *H05B 6/725* (2013.01); *F24C 7/087* (2013.01)

(58) Field of Classification Search
    CPC .. F24C 1/04; F24C 7/046; F24C 7/067; F24C 7/087; F24C 1/06; F24C 7/06; H05B 3/286; H05B 6/6402; H05B 6/6408; H05B 6/6435; H05B 6/6482; H05B 6/6491; H05B 6/687; H05B 6/725; H05B 3/6405; H05B 6/6411; H05B 1/0225; H05B 3/146; H05B 3/36; H05B 2203/003; H05B 2203/011; H05B 2203/016; H05B 2203/017; H05B 2203/02; H05B 2203/035; H05B 3/0076; H05B 2203/032; A61F 7/007; A61F 2007/0074; A61F 2007/0086; G05D 23/2401; H02H 5/043
    USPC .......... 99/333–334, 326–339, 386, 444–450, 99/467–479, 483; 219/449.1–451.1, 219/452.11–452.13, 453.12, 460.1, 461.1, 219/465.1–468.1, 475–480, 483, 520, 219/521–523, 538–553, 214, 395, 413, 219/385–389, 392, 394, 406, 411, 464, 219/528, 505–506; 392/435, 432, 418; 426/520; 312/236; 34/203, 208; 165/919, 918
    See application file for complete search history.

(56) References Cited

U.S. PATENT DOCUMENTS

| | | | |
|---|---|---|---|
| 6,297,481 B1* | 10/2001 | Gordon | A47J 39/006 |
| | | | 219/406 |
| 2006/0138123 A1* | 6/2006 | Ishii | H01C 17/06586 |
| | | | 219/549 |
| 2008/0213449 A1* | 9/2008 | Wisner | A47J 39/006 |
| | | | 426/520 |

FOREIGN PATENT DOCUMENTS

| | | | | |
|---|---|---|---|---|
| JP | 1991-107098 | * | 3/1991 | ............... H05B 3/20 |
| JP | 3-103206 | | 4/1991 | |
| JP | 4-268122 | | 9/1992 | |
| JP | 04268122 A | * | 9/1992 | ............... F24C 7/06 |
| JP | 2012-237508 | | 12/2012 | |
| JP | 2012237508 A | * | 12/2012 | ........... H05B 6/6408 |

OTHER PUBLICATIONS

English Translation of Chinese Search Report dated Mar. 28, 2019 for the related Chinese Patent Application No. 201680081156.4.

* cited by examiner

HEATING COOKER

CROSS-REFERENCE TO RELATED APPLICATIONS

This application is a U.S. national stage application of the PCT International Application No. PCT/JP2016/005201 filed on Dec. 21, 2016, which claims the benefit of foreign priority of Japanese patent application No. 2016-29406 filed on Feb. 19, 2016, the contents all of which are incorporated herein by reference.

TECHNICAL FIELD

The present invention relates to a heating cooker having a grill function of grilling a food item by using a planer heater so that the food item is browned.

BACKGROUND ART

Conventionally known as this kind of heating cooker is a heating cooker that heats an object to be heated from above and below or from above or below by using an upper surface heater that heats the object to be heated from above and a lower surface heater that heats the object to be heated from below (see, for example, Patent Literature 1).

FIG. 11 is a schematic view illustrating a heating cooker disclosed in Patent Literature 1, and FIG. 12 is a schematic view illustrating a configuration of an upper surface heater of the heating cooker disclosed in Patent Literature 1. The configuration is described below with reference to FIGS. 11 and 12.

Heating cooker 100 disclosed in Patent Literature 1 includes heating chamber 102 in which a food item that is object to be heated 101 is contained, upper surface heater 103 that heats object to be heated 101 from an upper surface of heating chamber 102, and lower surface heater 104 that heats object to be heated 101 from below object to be heated 101.

Object to be heated 101 is placed on tray 105 that is detachably supported in a central part of heating chamber 102.

Each of upper surface heater 103 and lower surface heater 104 is a planar heater configured such that heater wire 107 is wound around inner mica plate 106, and the planar heater constituted by mica plate 106 and heater wire 107 is sandwiched between lower mica plate 108 and upper mica plate 109, as illustrated in FIG. 12. The planar heater constituted by mica plate 106 and heater wire 107 is divided into outer heater 110 and inner heater 111, and upper surface heater 103 is configured such that outer heater 110 and inner heater 111 can be heated independently of each other. Object to be heated 101 is browned to an appropriate degree, for example, by combining a case where both of outer heater 110 and inner heater 111 are heated, a case where only outer heater 110 is heated, and a case where only inner heater 111 is heated and thus changing a temperature and a heating area of the upper surface of heating chamber 102.

CITATION LIST

Patent Literature

PTL 1: Unexamined Japanese Patent Publication No. 113-103206

SUMMARY OF THE INVENTION

However, in a case where outer heater 110 or inner heater 111 of upper surface heater 103 of conventional heating cooker 100 is heated independently, only portions of lower mica plate 108 and upper mica plate 109 that face the heated heater are locally heated. This causes inner distortion due to a difference in thermal expansion between a heated portion and a non-heated portion, resulting in deformation.

In particular, in a case where only inner heater 111 is heated, portions of upper mica plate 109 and lower mica plate 108 that face inner heater 111 expand outward (away from the heater) due to thermal expansion of the portions. This deteriorates heat transfer between inner heater 111 and lower mica plate 108, thereby leading to a possibility of excessive heating of inner heater 111. This causes problems such as a decrease in lifetime of heater and mica and a decrease in speed of heating of an object to be heated.

The present invention provides a heating cooker that is highly reliable and achieves shortening of a cooking period by suppressing internal distortion of an insulator caused by heating of a planar heater.

A heating cooker of the present invention includes a heating chamber in which an object to be heated is contained, a heater having a planar shape and disposed on an outer side of an upper surface of the heating chamber, and a pressing unit that presses the heater onto the upper surface of the heating chamber. Furthermore, the heater includes a continuous plane-shaped insulator, a planar heat generator provided in the insulator, and a distortion suppressor that suppresses internal distortion of the insulator that occurs due to heating of the planar heat generator.

Since the heater includes the distortion suppressor that suppresses internal distortion of the insulator, deformation is suppressed even in a case where the insulator is heated by the planar heat generator. This keeps contact between the planar heat generator and the insulator and contact between the heating chamber upper surface and the heater. Since heat transfer from the planar heat generator to the upper surface of the heating chamber is thus kept good, the planar heat generator is not excessively heated, and therefore it is possible to prolong lifetime of the planar heat generator and the insulator.

Furthermore, good heat transfer between the planar heat generator and the upper surface of the heating chamber increases a heat rising speed of the upper surface of the heating chamber. This makes it possible to increase a heating speed of the object to be heated. Since heat efficiency is high, it is possible to complete cooking in a short period.

DESCRIPTION OF EMBODIMENTS

Hereinafter, exemplary embodiments of the present invention will be described with reference to the drawings. The present invention is not limited to the exemplary embodiments.

First Exemplary Embodiment

Figure 1:
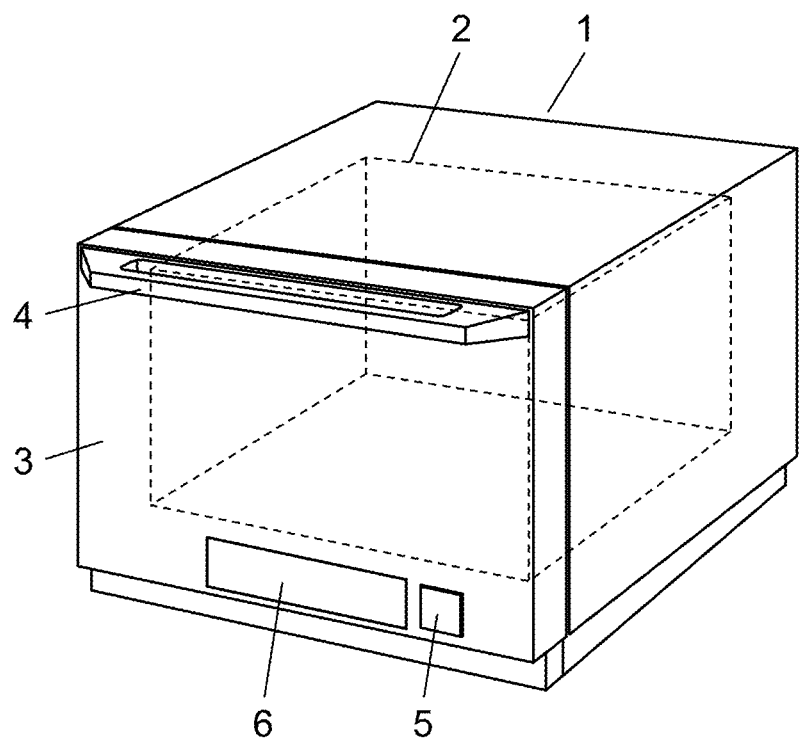
FIG. 1 is a perspective view illustrating external appearance of a heating cooker according to a first exemplary embodiment of the present invention.

FIG. 1 is a perspective view illustrating external appearance of heating cooker 1 according to a first exemplary embodiment of the present invention.

Heating cooker 1 according to the present exemplary embodiment heats object to be heated 7 by supplying at least one of a microwave and radiation heat to heating chamber 2 that is opened on a front side and in which object to be heated 7 (see FIG. 2) is contained, for example, like a microwave oven having a grill function.

In the present exemplary embodiment, it is assumed that a side on which the front opening of heating chamber 2 is located is referred to as front, a right-hand side of a user facing a rear side while standing at the front is referred to as right, and a left-hand side of the user facing the main body while standing at the front is referred to as left.

Heating chamber 2 is provided in a body of heating cooker 1. Door 3 with lighting window that opens and closes the opening of heating chamber 2 is provided on the front side of the body of heating cooker 1. A lower end of door 3 is pivotably supported on a lower end part of the body of heating cooker 1 with use of a hinge so that door 3 can move upward and downward and forward and backward. Door 3 constitutes part of an outer shell of heating cooker 1.

Door 3 has handle 4, operation button 5 used to enter a heating condition and information on object to be heated 7, and display 6 on which entered information, progress of cooking, and information on object to be heated 7 are displayed.

Figure 2:
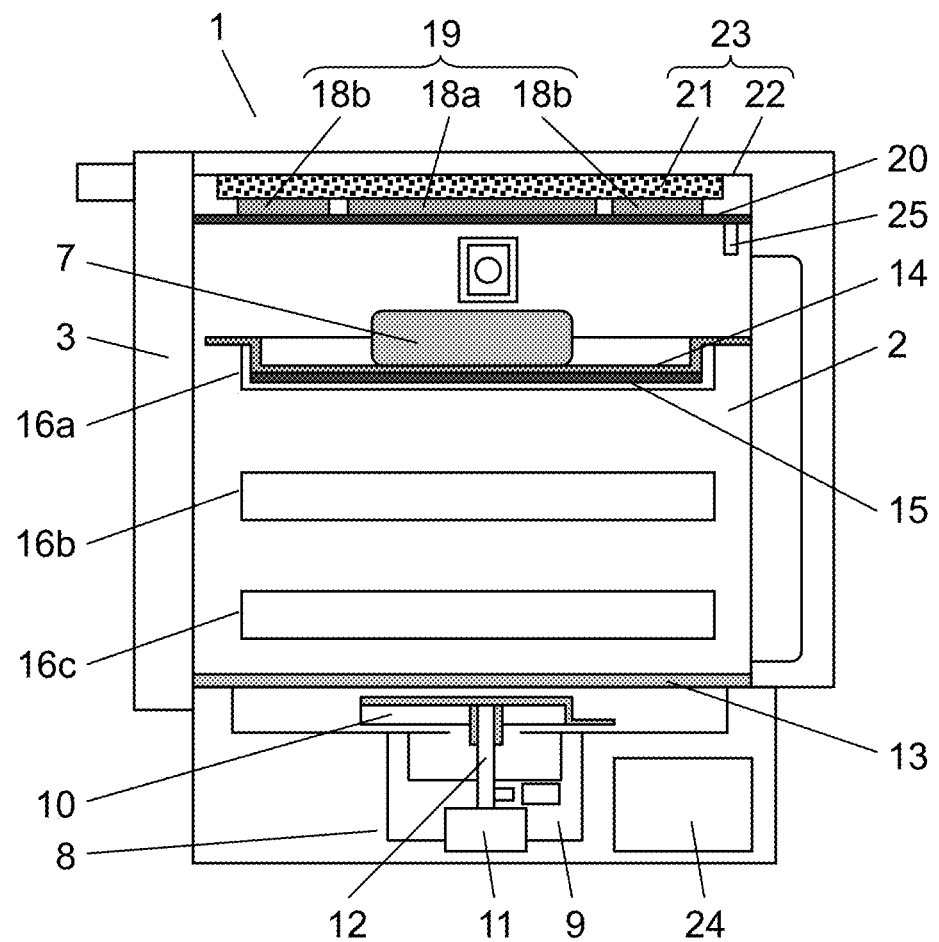
FIG. 2 is a schematic view of an inside of a heating chamber of a heating cooker according to the first exemplary embodiment of the present invention viewed from a side face.
Figure 3:
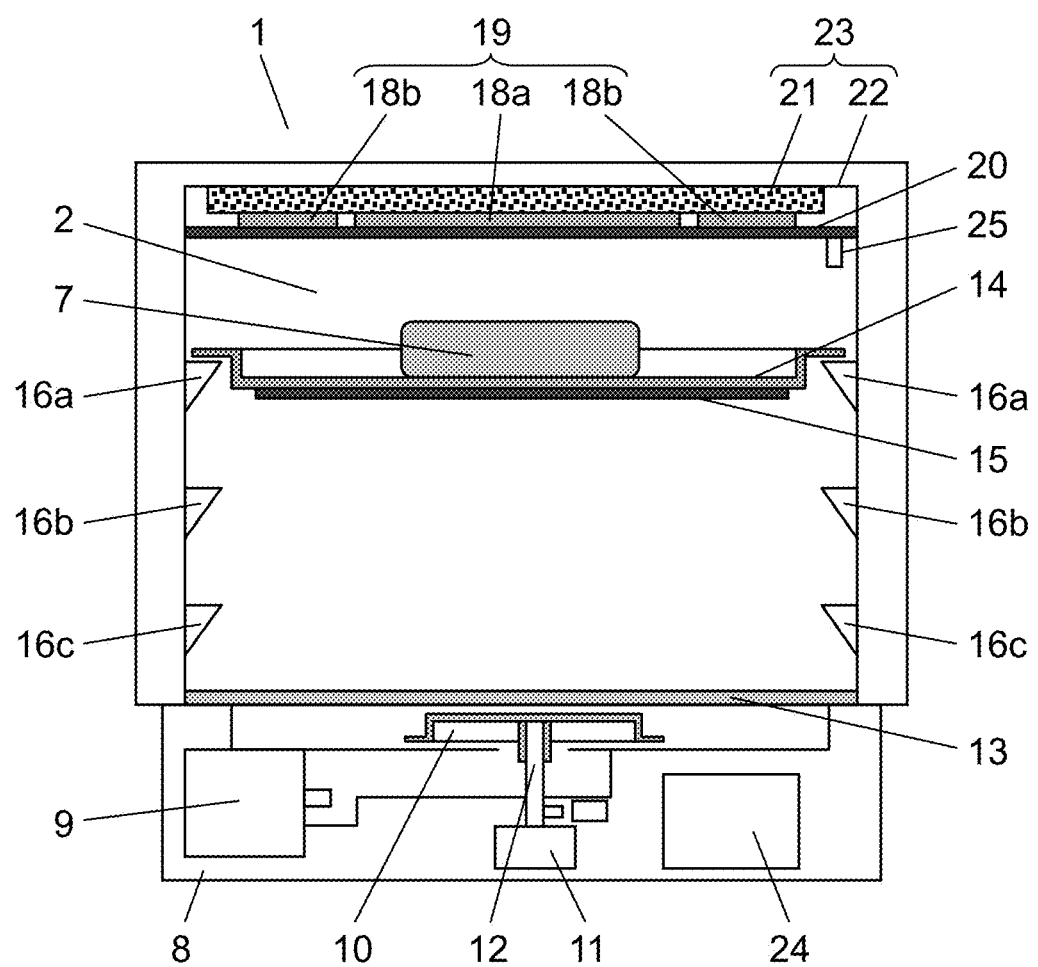
FIG. 3 is a schematic view of the inside of the heating chamber of the heating cooker according to the first exemplary embodiment of the present invention viewed from a front.
Figure 4:
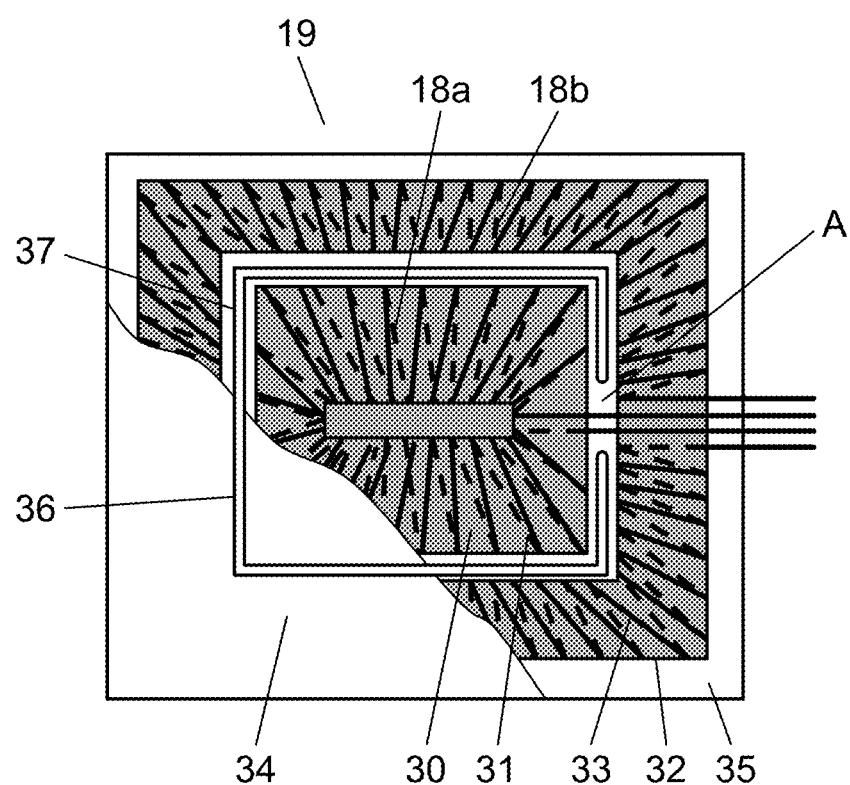
FIG. 4 is a schematic view of a heater of the heating cooker according to the first exemplary embodiment of the present invention viewed from above.

FIG. 2 is a schematic view illustrating an inside of a heating chamber of the heating cooker according to the first exemplary embodiment of the present invention viewed from a side face of the heating chamber, FIG. 3 is a schematic view illustrating the inside of the heating chamber of the heating cooker according to the first exemplary embodiment of the present invention viewed from a front side of the heating chamber, and FIG. 4 is a schematic view illustrating a heater (a second heater) of the heating cooker according to the first exemplary embodiment of the present invention viewed from an upper face of the heating chamber.

In FIGS. 2 through 4, microwave generating device 8 that heats object to be heated 7 by supplying a microwave to heating chamber 2 is provided below heating chamber 2. Microwave generating device 8 radiates a microwave generated by magnetron 9 into heating chamber 2 while stirring the microwave with use of antenna 10 that is a microwave stirrer.

Antenna 10 has directional characteristics regarding a direction of output of a microwave. The directional characteristics of antenna 10 are called radiation directivity. Antenna 10 is rotated about rotary shaft 12 by antenna driver 11 including a motor. During general heating, antenna driver 11 successively rotates antenna 10 to change a direction of output of a microwave so that object to be heated 7 in heating chamber 2 is uniformly heated, i.e., so that a microwave distribution in heating chamber 2 becomes uniform.

Glass plate 13 is made of crystallized glass and is disposed on a bottom surface of heating chamber 2. An object to be heated is placed on glass plate 13 during general microwave heating.

Tray 14 is used for grill cooking. Tray 14 has an upper surface on which object to be heated 7 is placed and a lower surface opposite to the upper surface. Microwave absorbing heat generator 15 that absorbs a microwave and generates heat is attached onto the lower surface of tray 14.

Microwave absorbing heat generator 15 that constitutes a first heater together with microwave generating device 8 absorbs a microwave supplied to heating chamber 2 and generates heat, the heat thus generated is transferred from the lower surface to the upper surface of tray 14, and thus object to be heated 7 placed on tray 14 is heated from below. The heat generated by microwave absorbing heat generator 15 is used for broiling using a microwave.

A plurality of (three in the present exemplary embodiment) supporting portions 16a, 16b, and 16c that have horizontal upper surfaces and extend horizontally in a front-back direction are provided on a right side wall and a left side wall of heating chamber 2 in order to support tray 14. Supporting portions 16a, 16b, and 16c support left and right ends of tray 14 so that tray 14 can be disposed at a position optimum for cooking, and tray 14 divides an inner space of heating chamber 2 into upper and lower parts.

Heater 19 (a second heater) is attached to a top part (an outer side of heating chamber 2) of heating chamber upper surface 20 that constitutes a top panel of heating chamber 2. Heating chamber upper surface 20 is divided into a region where planar heat generator 18a is located and a region where planar heat generator 18b is located so that heater 19 can selectively heat heating chamber upper surface 20 by energizing planar heat generators 18a and 18b independently of each other or concurrently with each other under control of controller 24 that will be described later.

Heater 19 that is a second heater is pressed against heating chamber upper surface 20 by pressing unit 23 that is constituted by heat insulating material 21 and heat shield plate 22. Heater 19 is in close contact with heating chamber upper surface 20 and therefore efficiently transmits heat.

Since heater 19 is not exposed to heating chamber 2, planar heat generators 18a and 18b are not affected by a microwave, and therefore a problem such as spark does not occur. Furthermore, since heating chamber upper surface 20 is flat, a food residue, oil, and the like attached to heating chamber upper surface 20 can be easily wiped off and therefore heating chamber upper surface 20 can be kept clean.

As illustrated in FIG. 4, planar heat generator 18a is configured such that electrically-heated wire 31 is wound around middle mica plate 30 that is an insulator. Planar heat generator 18b is configured such that electrically-heated wire 33 is wound around middle mica plate 32 that is an insulator. Heater 19 is configured such that planar heat generators 18a and 18b are sandwiched in a top-bottom direction between upper mica plate 34 and lower mica plate 35 that are insulators.

Upper mica plate 34 and lower mica plate 35 have portions that face planar heat generators 18a and 18b. Slit 36 is provided except for one part between the portions of upper mica plate 34 that face planar heat generators 18a and 18b. In the part (connection part A illustrated in FIG. 4) of upper mica plate 34 in which slit 36 is not provided, electrically-heated wire 31 connected to planar heat generator 18a is provided.

Slit 37 is provided except for one part between the portions of lower mica plate 35 that face planar heat generators 18a and 18b as in the case of upper mica plate 34. In the part (connection part A illustrated in FIG. 4) of lower mica plate 35 in which slit 37 is not provided, electrically-heated wire 31 connected to planar heat generator 18a is provided.

A large difference in temperature of generated heat occurs between planar heat generators 18a and 18b, for example, in a case where central planar heat generator 18a or circumferential planar heat generator 18b of heater 19 is heated independently by switching energization of planar heat generators 18a and 18b under control of controller 24. Accordingly, in upper mica plate 34 and lower mica plate 35, a large difference in temperature occurs between the portions that face planar heat generators 18a and 18b, and therefore a difference in thermal expansion occurs. Slits 36 and 37 absorb this difference in thermal expansion and thus suppresses distortion and deformation.

Microwave absorbing heat generator 15 that constitutes the first heater attached to the lower surface of tray 14 includes a high-temperature heat generating region whose temperature becomes high in a temperature distribution of heat generated by absorption of a microwave and a low-temperature heat generating region whose temperature becomes relatively low as compared with the high-temperature heat generating region.

Central planar heat generator 18a of heater 19 is located so as to face the high-temperature heat generating region of microwave absorbing heat generator 15 across tray 14. Circumferential planar heat generator 18b of heater 19 is located so as to face the low-temperature heat generating region of microwave absorbing heat generator 15 of tray 14 across tray 14.

In general, a microwave in heating chamber 2 forms a standing wave. Even if a microwave is stirred by rotating antenna 10, the microwave cannot be completely uniform because of a standing wave that changes due to the rotation.

Microwave absorbing heat generator 15 has a part that strongly generates heat and a part that weakly generates heat due to influence of the standing wave and therefore creates a temperature distribution. That is, the high-temperature heat generating region of tray 14 created by microwave absorbing heat generator 15 is experimentally found in advance, and planar heat generator 18a is provided so as to face this high-temperature heat generating region.

In a case where object to be heated 7 is efficiently heated by restricting a region, controller 24 controls antenna driver 11 so that radiation directivity of antenna 10 is directed toward the lower surface of tray 14 that corresponds to a lower side of object to be heated 7. For example, in a case where antenna 10 is directed to a front side of heating chamber 2, i.e., toward a side closer to door 3, a microwave tends to be concentrated onto the lower surface of tray 14 in the direction in which antenna 10 is directed, and therefore heat generation can be focused on the front side of tray 14. Furthermore, as for energization of heater 19, only planar heat generator 18a is energized.

In this way, object to be heated 7 placed on a central part of tray 14 can be heated in a concentrated manner.

A region to which a heating region of tray 14 is restricted is not limited to a side of tray 14 close to door 3, and may be a far side of heating chamber 2, i.e., a side far from door 3 or may be a left or right half of heating chamber 2. Temperature sensor 25 is provided on an upper part on a right far side inside heating chamber 2. When temperature sensor 25 detects that a temperature inside heating chamber 2 exceeds a preset temperature, temperature sensor 25 outputs a signal to controller 24. Controller 24 that has received the signal reduces supply of electric power to planar heat generators 18a and 18b and magnetron 9.

Figure 5A:
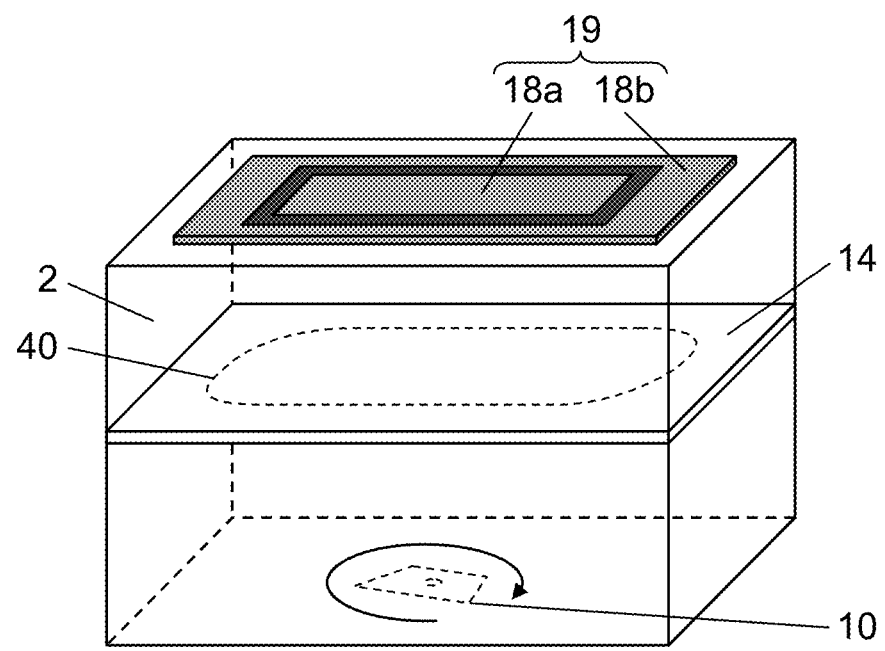
FIG. 5A is a conceptual diagram for illustrating a heating method in a case where a heating region in the heating chamber of the heating cooker according to the first exemplary embodiment of the present invention is not restricted.
Figure 5B:
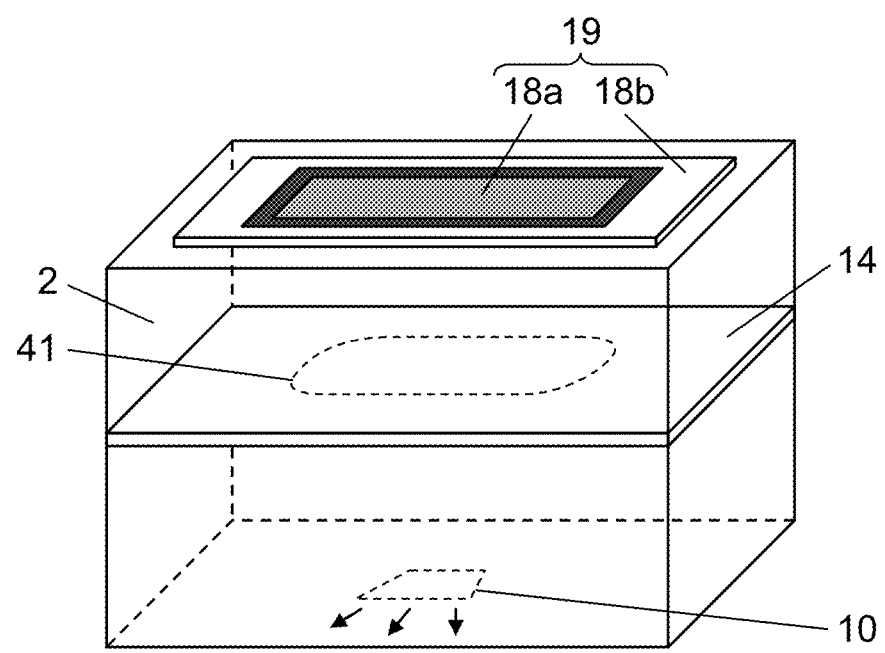
FIG. 5B is a conceptual diagram for illustrating a heating method in a case where a heating region in the heating chamber of the heating cooker according to the first exemplary embodiment of the present invention is restricted.

FIGS. 5A and 5B are conceptual diagrams for explaining a heating method in a case where a heating region in heating chamber 2 in FIG. 1 is restricted.

As illustrated in FIG. 5A, in a case where the heating region is not restricted, antenna 10 is rotated by 360 degrees, and a microwave is radiated into heating chamber 2. In this case, heater 19 that is the second heater energizes both of planar heat generators 18a and 18b. In general, heating of tray 14 using a microwave and operation of heater 19 are alternated due to restriction of a power source capacity.

In this way, whole tray 14 (region 40 illustrated in FIG. 5A) is heated by microwave irradiation of the whole lower surface of tray 14, and whole tray 14 is can be radiation-heated from above by planar heat generators 18a and 18b.

In a case where object to be heated 7 is placed only on the central part of tray 14 as illustrated in FIG. 2 and a restricted region is heated, only planar heat generator 18a is energized, and energization of planar heat generator 18b is stopped as illustrated in FIG. 5B.

Furthermore, antenna 10 is controlled to concentrate a microwave onto a central part (region 41 illustrated in FIG. 5B) of tray 14, and a position where object to be heated 7 is placed is intensively heated concurrently from above and below. This can improve efficiency of cooking and shorten a period of cooking.

An example of an effect of heating of a specific region of tray 14 concurrently from above and below is that an object to be heated can be efficiently heated as compared with a case where the whole region of tray 14 is heated separately from above or below.

Since heating chamber upper surface 20 radiates radiation heat to an upper surface of object to be heated 7, planar heat generators 18a and 18b need to heat heating chamber upper surface 20 first. Since a heat capacity and heat resistance increase accordingly, there is a limit to an increase of temperature rising speed of heating chamber upper surface 20.

In a case where heating from above and heating from below are separately performed, temperature rise is further delayed due to heating from above, and therefore a cooking period becomes longer. However, in a case where heating from above and heating from below are concurrently performed simply dividing electric power in half, a watt density of planar heat generators 18a and 18b is cut in half. This not only lowers a temperature rising speed, but also makes it impossible to obtain a temperature needed to brown object to be heated 7.

Next, setting of shapes of planar heat generators 18a and 18b illustrated in FIGS. 5A and 5B is described.

Figure 6A:
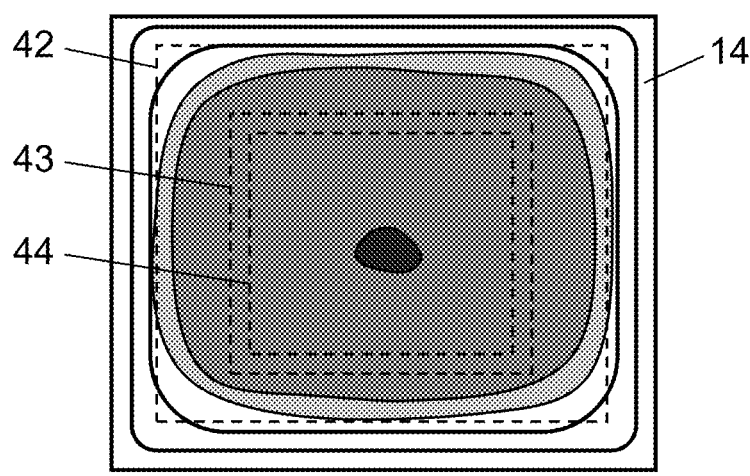
FIG. 6A is a conceptual diagram illustrating a heating distribution of an upper surface of a tray in a case where a heating region in the heating chamber of the heating cooker according to the first exemplary embodiment of the present invention is not restricted.
Figure 6B:
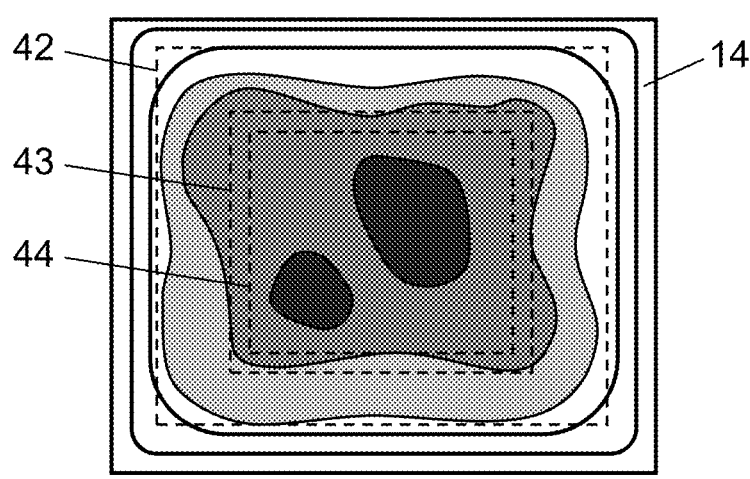
FIG. 6B is a conceptual diagram illustrating a heating distribution of an upper surface of a tray in a case where a heating region in the heating chamber of the heating cooker according to the first exemplary embodiment of the present invention is restricted.

FIGS. 6A and 6B are conceptual diagrams illustrating a heating distribution of an upper surface of tray 14. FIG. 6A illustrates a temperature distribution of tray 14 created by a microwave in a case where antenna 10 illustrated in FIG. 5A is rotated by 360 degrees. FIG. 6B illustrates a temperature distribution obtained in a case where antenna 10 is controlled so as to concentrate a microwave onto a central part of tray 14 as illustrated in FIG. 5B. In the temperature distribution illustrated in FIG. 6, a higher color density indicates a higher temperature.

In a case where antenna 10 is rotated by 360 degrees, the temperature distribution of the upper surface of tray 14 indicates that the almost entire surface is uniformly heated since a microwave is stirred by rotation of antenna 10, as illustrated in FIG. 6A. Broken lines 42, 43, and 44 in FIGS. 6A and 6B indicate heat generation regions of planar heat generators 18a and 18b (FIGS. 5A and 5B) on this region, and positions of planar heat generators 18a and 18b are set so as to match heat generation positions of tray 14.

In a case where antenna 10 is controlled so as to concentrate a microwave onto a central part of tray 14, the temperature distribution of the upper surface of tray 14 indicates that a high-temperature region is generated in the central part, as illustrated in FIG. 6B. However, even in a case where antenna 10 is controlled so as to concentrate a microwave onto the central part, the microwave cannot be concentrated only onto the central part. Rather, the microwave is relatively easily concentrated onto the central part at best.

Furthermore, it is hard to clearly set a high-temperature heat generating region within the heating region due to influence of occurrence of a standing wave from the microwave inside heating chamber 2. In view of this, a relationship between angle control of antenna 10 and the high-temperature heat generating region is experimentally found in advance, and the shape of planar heat generator 18a (FIGS. 5A and 5B) is set in accordance with the generated high-temperature heat generating region as indicated by broken line 42.

As described above, the shapes of planar heat generators 18a and 18b are set in accordance with the high-temperature heat generating region of tray 14, and therefore in a case where the heating region is restricted, object to be heated 7 placed in this high-temperature heat generating region can be efficiently heated from above and below.

A microwave from magnetron 9 is not entirely supplied to a rear surface of tray 14, and part of the microwave is supplied to a space above tray 14. Accordingly, an inside of object to be heated 7 is heated by the microwave supplied to the space above tray 14.

As illustrated in FIG. 2, the microwave generated from magnetron 9 is supplied to antenna 10, and the position where object to be heated 7 is placed on tray 14 is irradiated with the microwave in a concentrated manner by controlling driving of antenna 10.

The microwave concentrated onto the position where object to be heated 7 is placed on tray 14 by controlling antenna 10 causes microwave absorbing heat generator 15 located almost directly below object to be heated 7 to generate heat. In this way, a lower surface of object to be heated 7 can be browned, and direct heating of the inside of object to be heated 7 that is a characteristic of microwave heating can be performed.

Furthermore, the upper surface of object to be heated 7 can be efficiently browned by selectively controlling heating of planar heat generators 18a and 18b for radiation heating of object to be heated 7 from above under control of controller 24. It is thus possible to achieve shortening of a cooking period and good finishing of cooking.

Examples of a method for restricting a region heated from below in FIGS. 2 through 5A and 5B include the following method. Specifically, in a case where antenna 10 is directed toward object to be heated 7 or toward a front or back side of object to be heated 7 by controlling a direction and a speed of rotation of antenna 10, the antenna rotation speed is lowered or electric power supplied to magnetron 9 is increased as compared with the other cases. This makes it possible to increase an amount of heat supplied to object to be heated 7, thereby shortening a cooking period.

Various cases can be considered as the method for restricting the heating region. For example, a microwave radiation direction of antenna 10 may be reciprocated within a certain range (from a direction toward a right end of door 3 to a direction toward a left end of door 3).

In FIGS. 2 and 3, electric power need be distributed among planar heat generators 18a and 18b that constitute heater 19 and magnetron 9 within a range of a rated current value.

For example, of a rated allowable electric power value 1500 W in the case of 100 V-15 A, 1300 W is supplied to heater 19, and supply to magnetron 9 is stopped during heating of object to be heated 7 focused on heating from above. In this case, 650 W is supplied to each of planar heat generators 18a and 18b of heater 19.

During heating of object to be heated 7 focused on heating from below, heater 19 is stopped, and 1300 W is supplied to magnetron 9. During restriction of a heating region, 650 W is supplied to planar heat generator 18a of heater 19, and remaining 650 W is supplied to magnetron 9. In this case, supply to planar heat generator 18b is stopped.

As described above, the same amount of power is supplied to planar heat generator 18a both in the case of heating focused on heating from above and the case where the heating region is restricted, and therefore an almost equal amount of radiation heat is radiated from above to object to be heated 7 placed in the heated region in both of these cases. Furthermore, in the case where the heating region is restricted, the lower surface of tray 14 is also heated by a microwave, and part of the microwave directly heats object to be heated 7 from an inside. Accordingly, even in a case where the same amount of power is supplied, cooking can be completed in a short period since object to be heated 7 is heated from above and below and from an inside.

It is also possible to perform control for changing output of each heater depending on a kind of object to be heated 7 and to perform control of a heating period. For example, in the case of toast cooking, moisture is reduced by increasing output of microwave heating in an initial stage of the heating, and then output of heater 19 is increased so that a surface of the toast is well browned.

In this way, in a case where heating should be focused on a lower surface of object to be heated 7 in a heating process of object to be heated 7, planar heat generator 18a is not energized, and only planar heat generator 18b is energized, and microwave output is made as large as possible within a range of a rated allowable electric current value by using saved electric power for planar heat generator 18a. This increases an amount of heat generated from microwave absorbing heat generator 15 of tray 14, thereby promoting heating of the lower surface of object to be heated 7.

Similarly, in a case where heating should be focused on an upper surface, electric power saved by weakening microwave output is supplied to heater 19 so as to increase output for heating from above and promote heating of the upper surface of object to be heated 7.

By thus changing a combination of heating elements and distributing a period and supplied electric power depending on object to be heated 7, it is possible to achieve good finishing of object to be heated 7 and shorten a cooking period.

Second Exemplary Embodiment

Next, a configuration of a heater of a heating cooker according to a second exemplary embodiment of the present invention is described in detail with reference to the drawings.

Figure 7:
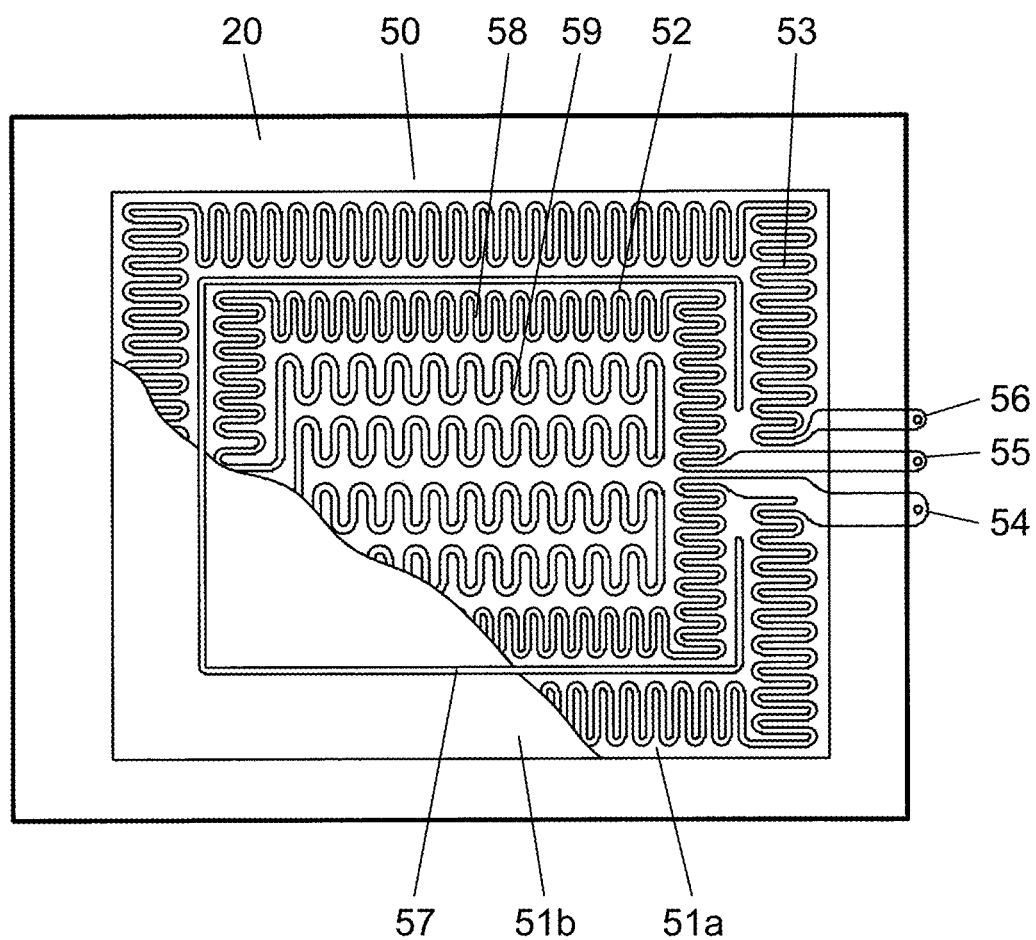
FIG. 7 is a schematic view of a heater of a heating cooker according to a second exemplary embodiment of the present invention viewed from above.

FIG. 7 is a schematic view of heater 50 (a second heater) of heating cooker 1 according to the second exemplary embodiment of the present invention viewed from above. In the present exemplary embodiment, constituent elements and functions that are similar to those in the first exemplary embodiment are given identical reference signs, and description of constituent elements similar to those in the first exemplary embodiment is omitted. A configuration of the whole heating cooker according to the present exemplary embodiment is similar to the configuration of heating cooker 1 illustrated in FIGS. 1 through 3, 5A, 5B, 6A, and 6B.

As illustrated in FIG. 7, heater 50 (the second heater) of the heating cooker according to the present exemplary embodiment is configured such that a metal foil such as stainless steel is punched as illustrated in FIG. 7 and is fixed by being integrally sandwiched between lower mica plate 51a and upper mica plate 51b that are insulating plates. Planar heat generator 52 is provided on a central side of heater 50, and planar heat generator 53 is provided on a circumferential side of heater 50. By applying a voltage across terminal 54 and terminal 55, an electric current is passed through planar heat generator 52, and planar heat generator 52 thus generates heat. By applying a voltage across terminal 54 and terminal 56, an electric current is passed through planar heat generator 53, and planar heat generator 53 thus generates heat. In a case where an electric current is passed through both of planar heat generator 52 and planar heat generator 53, both of whole planar heat generator 52 and whole planar heat generator 53 generate heat.

Lower mica 51a and upper mica 51b have slit 57 (distortion suppressor) provided between central planar heat generator 52 and circumferential planar heat generator 53. Slit 57 suppresses internal distortion occurring in lower mica 51a and upper mica 51b due to thermal expansion that occurs, for example, in a case where either planar heat generator 52 or planar heat generator 53 is heated or in a case where there is a large difference in heating amount.

For example, in a case where only central planar heat generator 52 of heater 50 is heated, portions of lower mica 51a and upper mica 51b that face planar heat generator 52 are heated, and lower mica 51a and upper mica 51b elongates so that areas thereof expand in a circumferential direction due to thermal expansion. Meanwhile, portions of lower mica 51a and upper mica 51b that face planar heat generator 53 are not heated and therefore do not thermally expand. Since slit 57 absorbs such a difference in elongation, thereby preventing occurrence of large internal distortion in lower mica 51a and upper mica 51b.

Central planar heat generator 52 of heater 50 has two heat generators, i.e., first central heat generator 58 on a circumferential side and second central heat generator 59 on a central side. A heat generation density of first central heat generator 58 on the circumferential side is set higher than a heat generation density of second central heat generator 59 on the central side. For example, the heat generation density of first central heat generator 58 is set to 2.5 W/cm$^2$, and the heat generation density of second central heat generator 59 is set to 1.5 W/cm$^2$.

A heat generation density of circumferential planar heat generator 53 of heater 50 in a circumferential part of a whole heating region including central planar heat generator 52 is set higher than the heat generation densities of central planar heat generator 52. For example, the heat generation densities of first central heat generator 58 and second central heat generator 59 that constitute central planar heat generator 52 are set as described above, and the heat generation density of circumferential planar heat generator 53 is set to 2.8 W/cm$^2$.

As described above, heater 50 is configured such that a heat generation density of a circumferential part in a heating region of central planar heat generator 52 or a heating region combining planar heat generator 52 and circumferential planar heat generator 53 is set high. Since the heat generation density is set high in the circumferential part of the heating region in which a rate of heat diffusion caused by heat transfer to heating chamber upper surface 20 is large in a case where the heating region is heated, it is possible to keep a decrease in temperature of the circumferential part of the heating region small, thereby achieving uniform heating of object to be heated 7.

Furthermore, a central part, which is the widest in area opposing the heating region, is easier to receive more radiation heat supplied to object to be heated 7, and a circumferential part, which is narrow in area opposing the heating region, is harder to receive the radiation heat. Accordingly, by setting the heat generation density of the circumferential part of the heating region high so that a temperature in the circumferential part of the heating region becomes higher than the central part of the heating region, object to be heated 7 can be more uniformly heated.

As a method for setting a heat generation density high in the circumferential part of the heating region combining central planar heat generator 52 and circumferential planar heat generator 53 of heater 50, electric power supplied to planar heat generator 53 and planar heat generator 52 may be controlled so that electric power supply to central planar heat generator 52 is kept smaller than circumferential planar heat generator 53 of heater 50.

In the present exemplary embodiment, the heat generation density of the whole circumferential part of the heating region is set high. However, object to be heated 7 can be more uniformly heated in a case where a heat generation density of corners of the heating region, where heat diffusion to heating chamber upper surface 20 is the largest, is set higher than a heat generation density of a portion other than the corners.

Third Exemplary Embodiment

Next, a configuration of a heater of a heating cooker according to a third exemplary embodiment of the present invention is described in detail with reference to the drawings.

Figure 8:
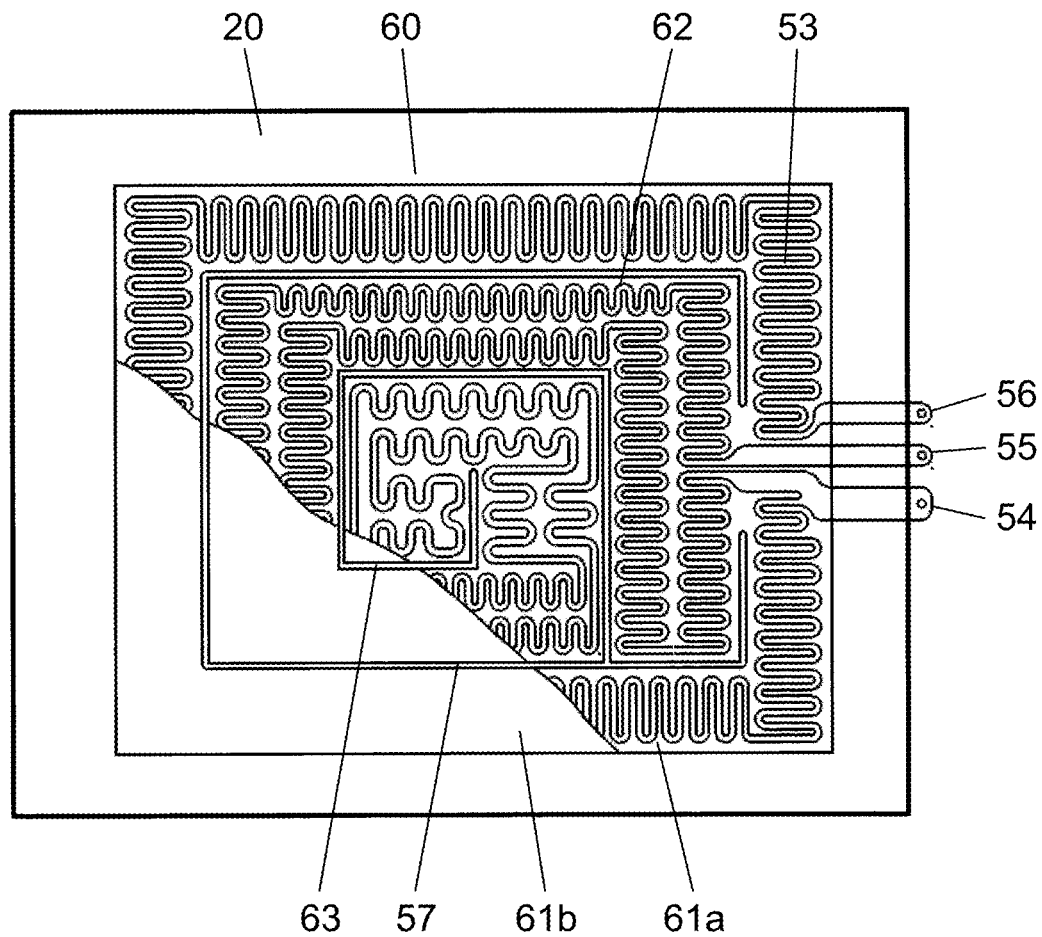
FIG. 8 is a schematic view of a heater of a heating cooker according to a third exemplary embodiment of the present invention viewed from above.

FIG. 8 is a schematic view of heater 60 (a second heater) of heating cooker 1 according to the third exemplary embodiment of the present invention viewed from above. In the present exemplary embodiment, constituent elements that are similar to those in the first exemplary embodiment and the second exemplary embodiment are given identical reference signs, and description of constituent elements similar to those in the first and second exemplary embodiments is omitted. A configuration of whole heating cooker 1 according to the present exemplary embodiment is similar to the configuration of heating cooker 1 illustrated in FIGS. 1 through 3, 5A, 5B, 6A, and 6B.

As illustrated in FIG. 8, heater 60 (the second heater) according to the present exemplary embodiment is configured such that a metal foil such as stainless steel is punched as illustrated in FIG. 8 and is fixed by being integrally sandwiched between lower mica plate 61a and upper mica plate 61b that are insulating plates, as in the second exemplary embodiment. A difference from the second exemplary embodiment of the present invention is that planar heat generator 62 (central heat generator) provided on a central side is disposed so as to draw a spiral shape and that slit 63 (distortion suppressor) is spirally disposed in a gap of planar heat generator 62.

Slit 57 between central planar heat generator 62 and circumferential planar heat generator 53 (circumferential heat generator) suppresses internal distortion occurring in lower mica 61a and upper mica 61b, and spiral slit 63 provided in central planar heat generator 62 decreases rigidity in a direction perpendicular to a plane of heater 60, and a heat generation surface of heater 60 is easily made in close contact with heating chamber upper surface 20 by a weight of pressing unit 23 (FIG. 1).

Furthermore, even in a case where thermal deformation of heater 60 itself or thermal deformation of heating chamber upper surface 20 is caused by heating, close contact between the heat generation surface of heater 60 and heating chamber upper surface 20 can be maintained because of a low rigidity of heater 60.

Accordingly, heat transfer from heater 60 to heating chamber upper surface 20 is kept good, and therefore heat transfer from central planar heat generator 62 and circumferential planar heat generator 53 to heating chamber upper surface 20 is kept good. This prevents central planar heat generator 62 and circumferential planar heat generator 53 from being excessively heated, thereby prolonging lifetime of planar heat generators 53 and 62 and lower mica 61a and upper mica 61b that are insulating plates.

Figure 9:
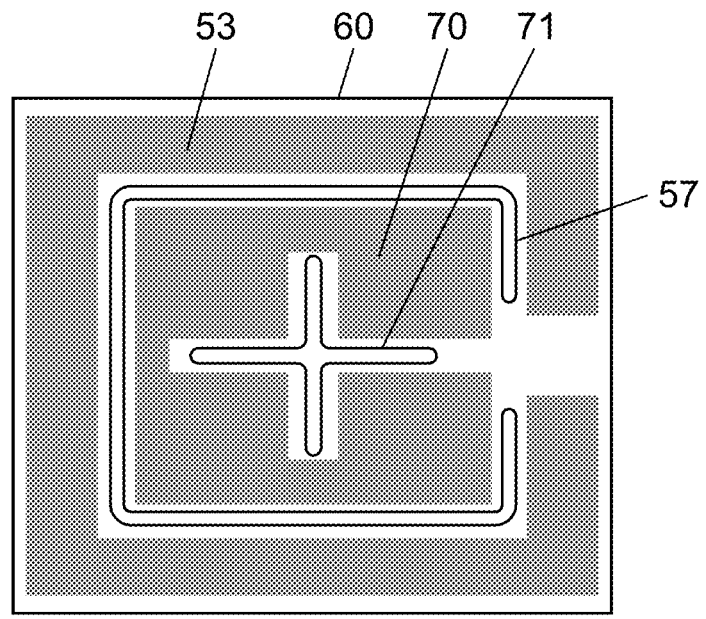
FIG. 9 is a schematic view of a case where the heater of the heating cooker according to the third exemplary embodiment of the present invention has a cross-shaped slit viewed from above.
Figure 10:
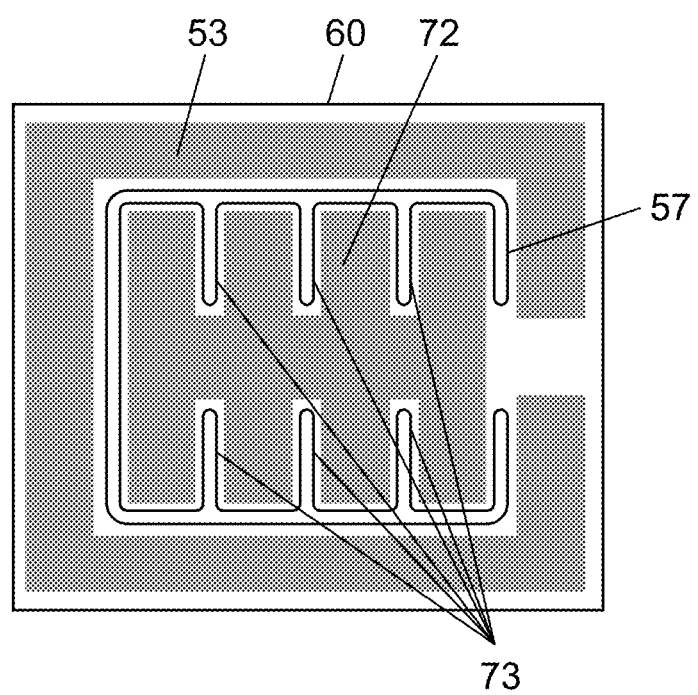
FIG. 10 is a schematic view of a case where the heater of the heating cooker according to the third exemplary embodiment of the present invention has a comb-shaped slit viewed from above.
Figure 11:
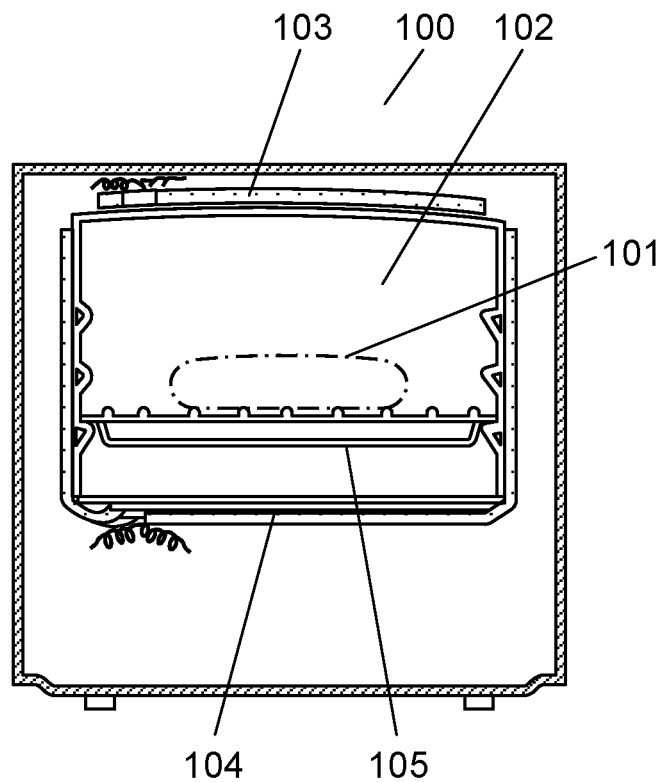
FIG. 11 is a schematic view illustrating a cross-section of a configuration of a conventional heating cooker.
Figure 12:
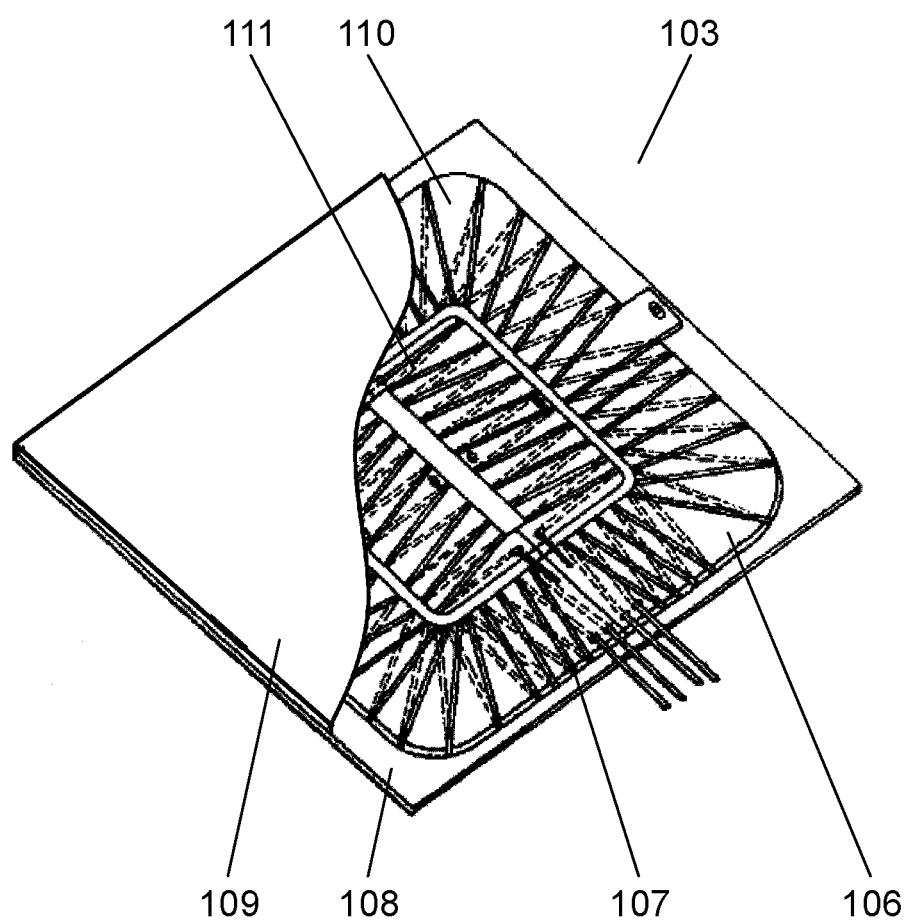
FIG. 12 is a schematic view illustrating a configuration of a heater of the conventional heating cooker.

As for a shape of a slit for lowering rigidity of heater 60, cross-shaped slit 71 (distortion suppressor) may be provided at a center of central planar heat generator 70 as illustrated in FIG. 9. A similar effect can be obtained even in a case where comb-shaped slit 73 (distortion suppressor) is provided on central planar heat generator 72 side as illustrated in FIG. 10.

As described above, a heating cooker of the present invention includes a heating chamber in which an object to be heated is contained, a heater having a planar shape and disposed on an outer side of an upper surface of the heating chamber, and a pressing unit that presses the heater onto the upper surface of the heating chamber. Furthermore, the heater includes an insulator having a continuous plane-shape, a planar heat generator provided in the insulator, and a distortion suppressor that suppresses internal distortion of the insulator that occurs due to heating of the planar heat generator.

The distortion suppressor that suppresses internal distortion of the insulator suppresses deformation even in a case where the insulator is heated by the planar heat generator. This keeps contact between the planar heat generator and the insulator and contact between the heating chamber upper surface and the heater. Since heat transfer from the planar heat generator to the upper surface of the heating chamber is thus kept good, the planar heat generator is prevented from being excessively heated, and therefore it is possible to prolong lifetime of the planar heat generator and the insulator.

Furthermore, good heat transfer between the planar heat generator and the upper surface of the heating chamber increases a temperature rising speed of the upper surface of the heating chamber. This makes it possible to increase a heating speed of the object to be heated. Since heat efficiency is high, it is possible to complete cooking in a short period.

Furthermore, the heating cooker of the present invention may be configured such that a slit obtained by cutting out a portion where distortion of the insulator becomes large is provided as the distortion suppressor. The planar heat generator may be disposed so as to avoid the slit.

The slit allows the insulator to elongate due to thermal expansion. This suppresses internal distortion, thereby preventing deformation such as warpage and bulging. Accordingly, heat transfer from the planar heat generator to the upper surface of the heating chamber can be kept good.

The heating cooker of the present invention may be configured to include a plurality of planar heat generators that heat a plurality of divided heating regions of the upper surface of the heating chamber, and a slit obtained by cutting out the insulator may be provided as the distortion suppressor between the planar heat generators.

According to this configuration, even in a case where one or more of the plurality of planar heat generators is heated and part of the insulator that makes contact with this planar heat generator is heated, the presence of the slit in the insulator suppresses internal distortion caused by thermal expansion of the insulator, thereby preventing deformation such as warpage or bulging.

Furthermore, the heating cooker of the present invention may be configured such that the slit is disposed so as to lower rigidity of the heater.

According to this configuration, even in a case where the upper surface of the heating chamber is deformed by thermal expansion, the heater flexibly deforms due to a weight of the pressing unit and can be made close contact with the upper surface of the heating chamber. Since heat transfer from the heater to the upper surface of the heating chamber is thus kept good, the planar heat generator is prevented from being excessively heated, and therefore it is possible to prolong lifetime of the planar heat generator and the insulator.

Furthermore, the heating cooker of the present invention may be configured such that the slit is disposed so as to divide a circumferential part and a central part of a plane of the heater.

According to this configuration, even in a case where the insulator is locally heated by independently heating the circumferential part or the central part of the heater, the presence of the slit in the insulator makes it possible to suppress warpage and deformation caused by thermal expansion of the insulator. Furthermore, for example, in a case where an area of the object to be heated is small or in a case where an amount of the object to be heated is small, unnecessary heating can be saved by heating only the central part of the heater, and it is therefore possible to efficiently heat the object to be heated.

Furthermore, the heating cooker of the present invention may be configured such that the slit is disposed so as to spirally divide the plane of the heater.

The presence of the slit that spirally divides the heater lowers rigidity in a direction perpendicular to the plane of the heater, and a heat generation surface of the heater is easily made close contact with the upper surface of the heating chamber due to the weight of the pressing unit. Since heat transfer from the heater to the upper surface of the heating chamber is thus kept good, the planar heat generator is prevented from being excessively heated, and therefore it is possible to prolong lifetime of the planar heat generator and the insulator.

Furthermore, the heating cooker of the present invention may be configured to include a microwave generating device that supplies a microwave to the heating chamber and a tray that is held inside the heating chamber so as to divide the heating chamber in a top-bottom direction, on which the object to be heated is placed, and that has, on a rear surface, a microwave absorbing heat generator that absorbs a microwave. Furthermore, the heating cooker of the present invention may be configured to include a controller that controls operation of microwave generator and heater, and the controller may change a heating region of the heater in accordance with a kind of object to be heated and a quantity of object to be heated and properly control output of the microwave generating device.

According to this configuration, matching between a heating position of the object to be heated on the tray and a heating position of the heater can be achieved, and therefore the object to be heated can be efficiently heated from above and below. It is therefore possible to shorten a cooking period and reduce electric power consumption.

INDUSTRIAL APPLICABILITY

As described above, the present invention can be used for a heating cooker having a grill function of heating a food item so that the food item is browned by using a planar heater and can be used for heating of all kinds of objects to be heated for which radiation heating from a planar heater is available.

REFERENCE MARKS IN THE DRAWINGS 1, 100: heating cooker
2, 102: heating chamber
7, 101: object to be heated
8: microwave generating device
14, 105: tray
15: microwave absorbing heat generator
18a, 18b, 52, 53, 62, 70, 72: planar heat generator
19, 50, 60: heater (second heater)
20: heating chamber upper surface
24: controller
36, 37, 57: slit (distortion suppressor)
63: spiral slit (distortion suppressor)
71: cross-shaped slit (distortion suppressor)
73: comb-shaped slit (distortion suppressor)

The invention claimed is:
1. A heating cooker comprising:
a tray on which an object to be heated is to be placed;
a heating chamber in which the object to be heated and the tray are to be contained;
a pair of supporting portions provided at a same level on left and right inner side walls of the heating chamber;
a first heater disposed below the tray to heat the tray;
a second heater disposed over the tray to heat the tray, the second heater having:
 a plurality of planar heat generators including a central planar heat generator and a circumferential planar heat generator; and
 two insulators including a first insulator and a second insulator; and
 an electrically-heated wire connected to the central planar heat generator; and
a controller operable to control output of the first heater and switch which of the plurality of planar heat generators of the second heater is to be energized in accordance with at least one of a kind of the object to be heated and a quantity of the object to be heated,
wherein each of the two insulators has a planar shape, and the plurality of planar heat generators are sandwiched between the first insulator and the second insulator,
wherein the controller is operable to heat regions that are disposed over and below the tray and opposed to each other by controlling energization of the first heater and the second heater,
wherein the first insulator includes:
 a first central portion that faces the central planar heat generator;
 a first circumferential portion that faces the circumferential planar heat generator;
 a first connection part that connects the first central portion and the first circumferential portion; and
 a first slit that is located between the first central portion and the first circumferential portion, and surrounds the first central portion except for the first connection part,
wherein the second insulator includes:
 a second central portion that faces the central planar heat generator;
 a second circumferential portion that faces the circumferential planar heat generator;
 a second connection part that connects the second central portion and the second circumferential portion; and
 a second slit that is located between the second central portion and the second circumferential portion, and surrounds the second central portion except for the second connection part, and
wherein the electrically-heated wire is provided between the first connection part and the second connection part.
2. The heating cooker according to claim 1, wherein the first heater includes a microwave generating device and a microwave absorbing heat generator, the microwave generating device having microwave radiation directivity and supplying a microwave to the heating chamber, and the microwave absorbing heat generator being provided on a lower surface of the tray, and the second heater is disposed above an upper surface of the heating chamber and is pressed against the upper surface of the heating chamber by a pressing unit.

3. The heating cooker according to claim 1, wherein the plurality of planar heat generators are disposed so as to avoid the first and second slits in a plan view.

4. The heating cooker according to claim 3, wherein the first and second slits are disposed so as to lower rigidity of the second heater.

5. The heating cooker according to claim 1, wherein the first heater includes a microwave generating device that supplies a microwave to the heating chamber, the tray is held inside the heating chamber and divides the heating chamber into upper and lower parts, and the tray having a lower surface provided with a microwave absorbing heat generator that absorbs the microwave, the second heater heats the tray by radiation heat from an upper surface of the heating chamber, and the controller changes a heating region of the second heater in accordance with the kind of the object to be heated and the quantity of the object to be heated and controls output of the microwave generating device.

6. The heating cooker according to claim 1, wherein the two insulators are plates.

7. The heating cooker according to claim 1, wherein the first insulator further includes a first cross-shaped slit that has a cross shape and is located inside the first slit, and the second insulator further includes a second cross-shaped slit that has a cross shape and is located inside the second slit.

8. A heating cooker comprising:

a tray on which an object to be heated is to be placed;

a heating chamber in which the object to be heated and the tray are to be contained;

a pair of supporting portions provided at a same level on left and right inner side walls of the heating chamber;

a first heater disposed below the tray to heat the tray;

a second heater disposed over the tray to heat the tray, the second heater having:

a plurality of planar heat generators including a central planar heat generator and a circumferential planar heat generator; and two insulators including a first insulator and a second insulator; and a controller operable to control output of the first heater and switch which of the plurality of planar heat generators of the second heater is to be energized in accordance with at least one of a kind of the object to be heated and a quantity of the object to be heated, wherein each of the two insulators has a planar shape, and the plurality of planar heat generators are sandwiched between the first insulator and the second insulator, wherein the controller is operable to heat regions that are disposed over and below the tray and opposed to each other by controlling energization of the first heater and the second heater, wherein the first insulator includes:

a first central portion that faces the central planar heat generator;

a first circumferential portion that faces the circumferential planar heat generator;

a first slit that has a linear shape and is located between the first central portion and the first circumferential portion;

a second slit that has a linear shape and is located between the first central portion and the first circumferential portion; and a first cross-shaped slit that has a cross shape and is located between the first slit and the second slit, and wherein the second insulator includes:

a second central portion that faces the central planar heat generator;

a second circumferential portion that faces the circumferential planar heat generator;

a third slit that has linear shape and is located between the second central portion and the second circumferential portion;

a fourth slit that has a linear shape and is located between the second central portion and the second circumferential portion; and a second cross-shaped slit that has a cross shape and is located between the third slit and the fourth slit.

* * * * *